US006722004B2

United States Patent

Recupero

(10) Patent No.: US 6,722,004 B2
(45) Date of Patent: Apr. 20, 2004

(54) AUTOMATIC WELDING GUN ELECTRODE RESHAPING DEVICE

(75) Inventor: Antonio Recupero, Turin (IT)

(73) Assignee: Advanced Technologies s.r.l., Pianezza (IT)

( * ) Notice: Subject to any disclaimer, the term of this patent is extended or adjusted under 35 U.S.C. 154(b) by 0 days.

(21) Appl. No.: 10/212,254

(22) Filed: Aug. 6, 2002

(65) Prior Publication Data

US 2003/0041428 A1 Mar. 6, 2003

(30) Foreign Application Priority Data

Sep. 6, 2001 (IT) .................................... MI2001A1867

(51) Int. Cl.⁷ ............................................... B23P 23/04
(52) U.S. Cl. ...................... 29/33 R; 409/140; 409/138
(58) Field of Search .......................... 29/33 R; 409/140, 409/138; 451/65; 72/126

(56) References Cited

U.S. PATENT DOCUMENTS 4,578,005 A * 3/1986 Fuse et al. .................. 409/140
5,725,340 A * 3/1998 Nakajima et al. ........... 409/140
6,024,521 A * 2/2000 Swaggerty .................. 409/131
6,106,203 A * 8/2000 Asmis et al. ............... 409/137
6,195,860 B1 * 3/2001 Di Rosa et al. ............ 29/33 R

FOREIGN PATENT DOCUMENTS

JP          1-153208      *  1/1989  ................. 409/140

* cited by examiner

*Primary Examiner*—A. L. Wellington
*Assistant Examiner*—Dana Ross
(74) *Attorney, Agent, or Firm*—Jacobson Holman PLLC

(57) ABSTRACT

A welding gun electrode reshaping device includes a head with satellites supported by a satellite holder to identify between them opposing seats for the gun electrode tip. The satellite holder is powered to be rotated around the seats to move the satellites around the electrode tip zone and cause reshaping of the electrode tip. In the seats there is a support member for the electrode tip with a surface designed for simultaneous smoothing of a 'lense' zone on the electrode tip. A movement mechanism enables positioning of the head in an operational zone.

10 Claims, 5 Drawing Sheets

AUTOMATIC WELDING GUN ELECTRODE RESHAPING DEVICE

BACKGROUND OF THE INVENTION

1. Field of the Invention

The present invention relates to an innovative automatic device for reshaping electrodes in welding guns.

2. State of the Prior Art

In the prior art the problem of deterioration of welding electrodes is well known and in particular in welding stations such as those of automotive vehicle assembly lines and the like.

During operation the electrodes undergo deformation and surface distortion which progressively reduce the quality of the welds performed.

In most cases the problem has been solved by using dressing devices which periodically mill the electrode tips. Removal of material however reduces the useful life of the electrode and therefore it is sought to perform the dressing operations as rarely as possible. The frequency of the dressing operations is thus the fruit of a compromise between the electrode life and acceptable welding quality decay between operations.

Reshaping devices have also been proposed which follow the electrode tip to seek to give it back the original shape while avoiding material removal. With these devices the shape of the electrode tip is improved but the problem of distortion of the lense shape which can display crests which obstruct welding operations is not solved.

In the prior art it was sought to solve the problem by first passing the electrode through the reshaping device and then in a processing device with material removal. In addition to lengthening electrode dressing operations there is the disadvantage that this involves removal of a certain amount of material. Thus the initial problem of avoiding frequent material removal which shortens the electrode's useful life reappears.

The general purpose of the present invention is to remedy the above mentioned shortcomings by making available an electrode reshaping device which would allow satisfactory dressing and smoothing of the electrode tip with minimal material removal.

SUMMARY OF THE INVENTION

In view of this purpose it was sought to provide in accordance with the present invention a welding gun electrode reshaping device comprising a head with satellites supported by a satellite holder to identify between them opposing seats for the gun electrode tip with the satellite holder being powered to rotate around said seats to move the satellites around the electrode tip zone and provoke reshaping of said tip zone with there being in said seats a support member for the electrode tip in the seat with surface designed for simultaneous smoothing of a lense zone on the electrode tip.

BRIEF DESCRIPTION OF THE DRAWINGS

To clarify the explanation of the innovative principles of the present invention and its advantages compared with the prior art there is described below with the aid of the annexed drawings possible embodiments thereof by way of non-limiting example applying said principles in welding systems or with fixed, manual or robot-mounted guns. In the drawings.

DETAILED DESCRIPTION OF THE INVENTION

Figure 1:
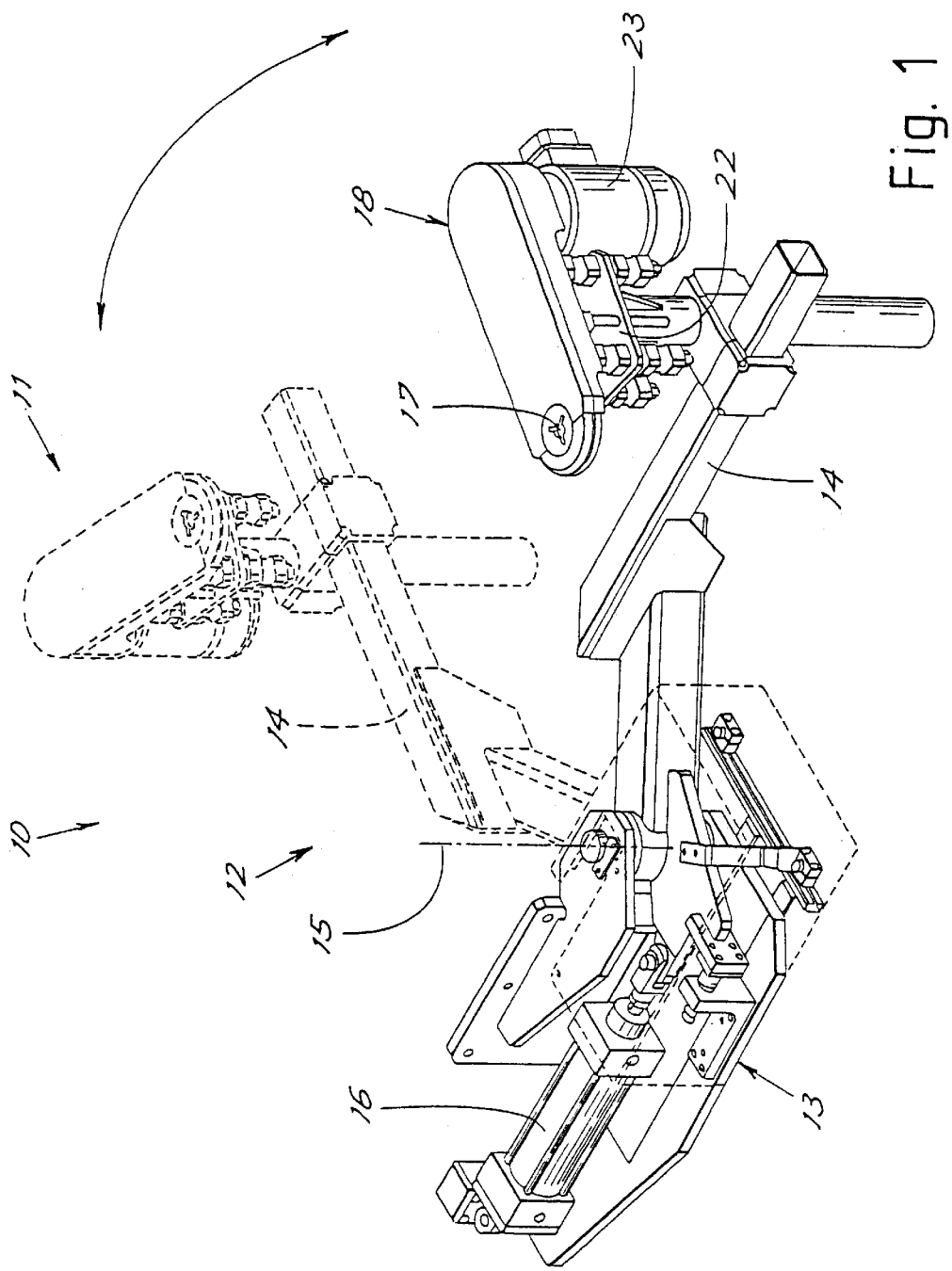
FIG. 1 shows a perspective view of the reshaping device in accordance with the present invention.

With reference to the figures, FIG. 1 shows a reshaping device designated as a whole by reference number 10 realized in accordance with the present invention. It comprises a reshaping head 11 supported on a support mechanism 12. The support mechanism comprises a base 13 on which a support arm 14 is hinged along an axis 15. A drive 16 (for example, an actuator cylinder) moves the arm 14 between a rest or retracted position shown in broken lines and an operating position shown in solid lines. In the first position the head 11 is positioned in a zone which does not create an obstruction to the welding operations while in the operating position the head 11 is located in a position which facilitates reshaping operations. In particular, in the case of fixed guns, in the operating position the head 11 will be exactly between the welding guns to have the electrodes aligned with a reshaping seat 17.

Figure 2:
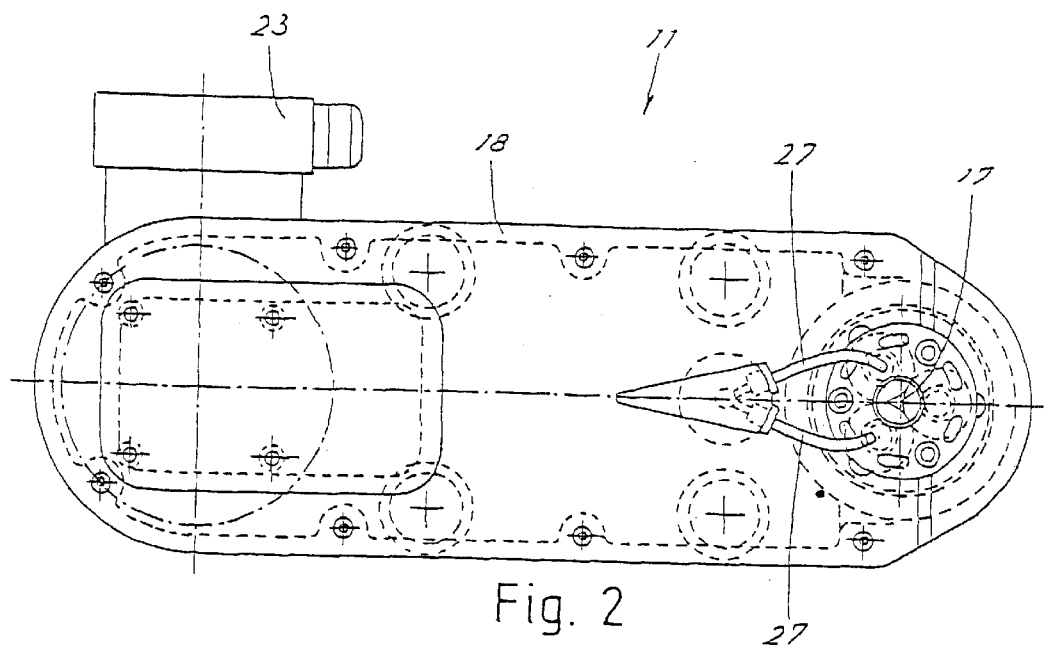
FIG. 2 shows a plan view of a detail of the device.
Figure 3:
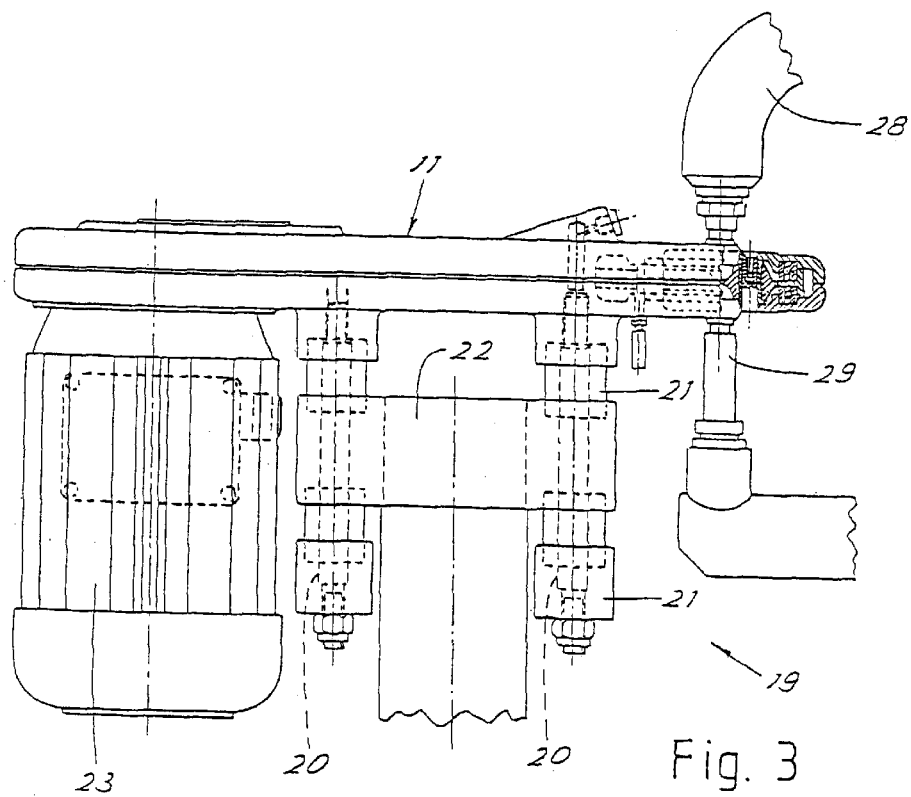
FIG. 3 shows a side elevation view of the detail of FIG. 2.

FIGS. 2 and 3 show the reshaping head 11. The latter comprises a body 18 fastened centrally to the support 14 by an elastic suspension 19 to cushion the operating vibrations. In particular the suspension comprises pins 20 which fasten the head to a bracket 22 of the support with interposition of elastically yielding buffers 21 for example of thermoplastic resin.

As may be seen in the figures at one end of the body is located the reshaping seat 17 advantageously fitted with cleaning nozzles 27 which blow to eliminate particles, debris et cetera which could adhere to the electrodes while at the other end there is the drive motor 23.

Figure 4:
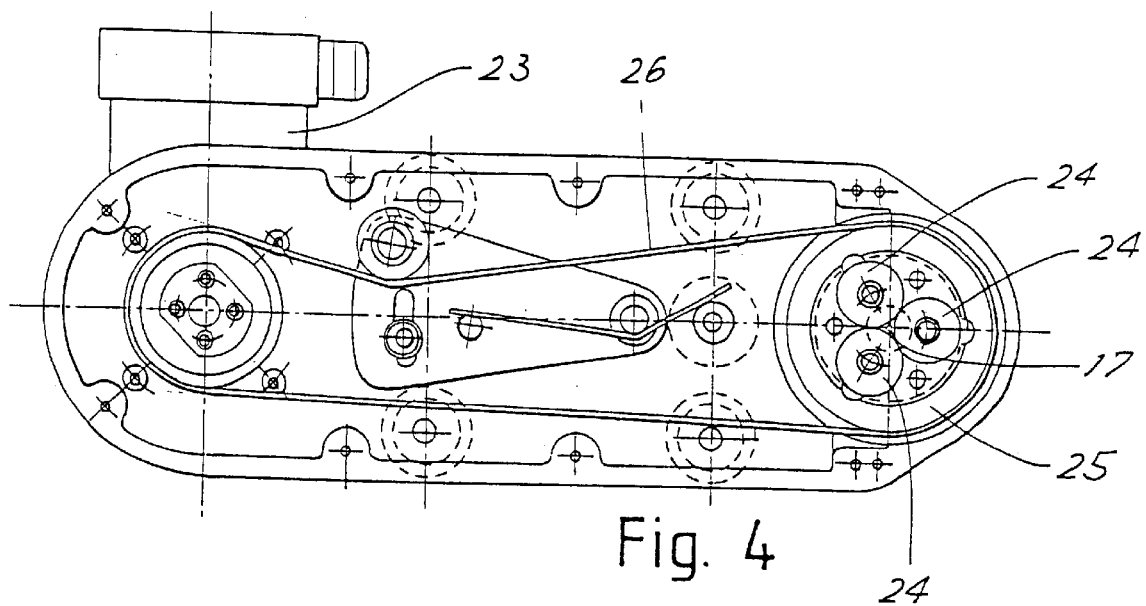
FIG. 4 shows a view similar to that of FIG. 2 but with a closing cover removed.

As may be seen better in FIG. 4 the reshaping seat is the space between three satellites 24 which are supported and arranged 120° apart on a satellite holder 25 rotated by the motor 23 through a transmission belt 26.

Figure 5:
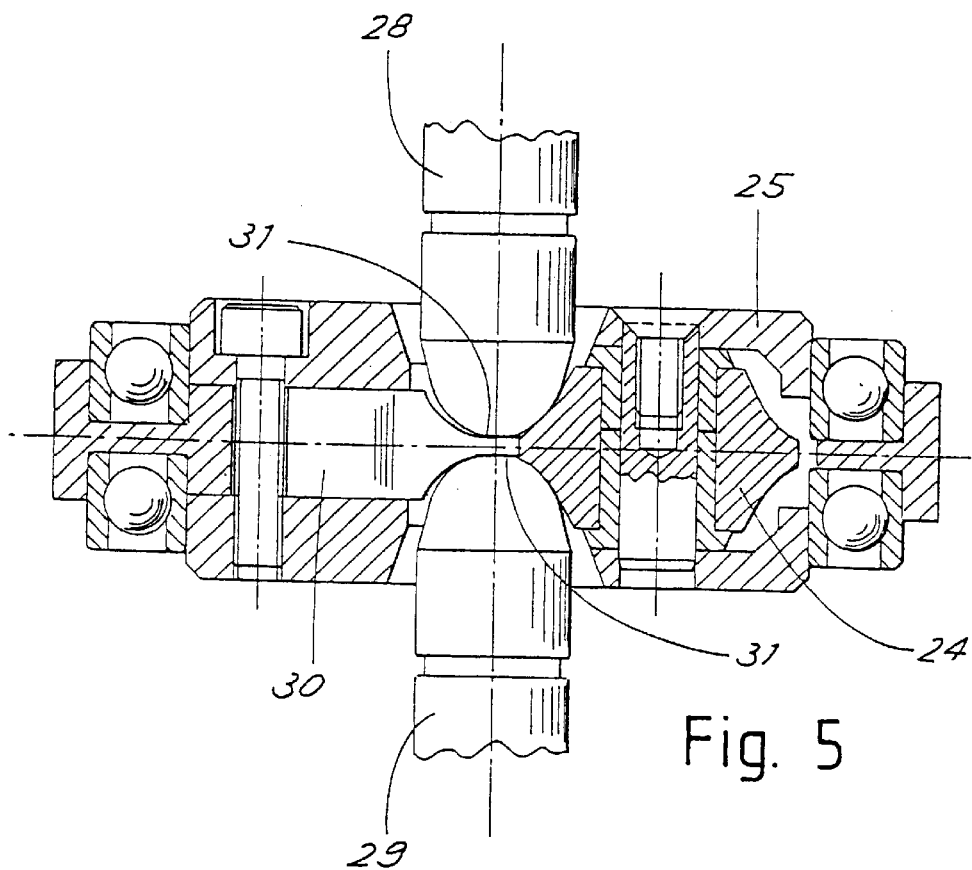
FIG. 5 shows a cross sectioned side view of a reshaping seat located in the device.

FIG. 5 shows in greater detail the satellite holder with the satellites shaping the reshaping seat and a pair of electrodes 28, 29 in processing position in the seat. As may be seen in this figure the satellites have their side surface shaped to mate with part of the side surface of the tip of the two electrodes which enter into the seat from opposite directions. The satellites thus identify two opposed reshaping seats. Each electrode thus has its tip shaped on the sides by the joint action of the three satellites which turn around it.

The satellites are made of high-strength steel and can be covered with very hard layers with a hard metal base such as those used in tooling, chromium for example.

Figure 6:
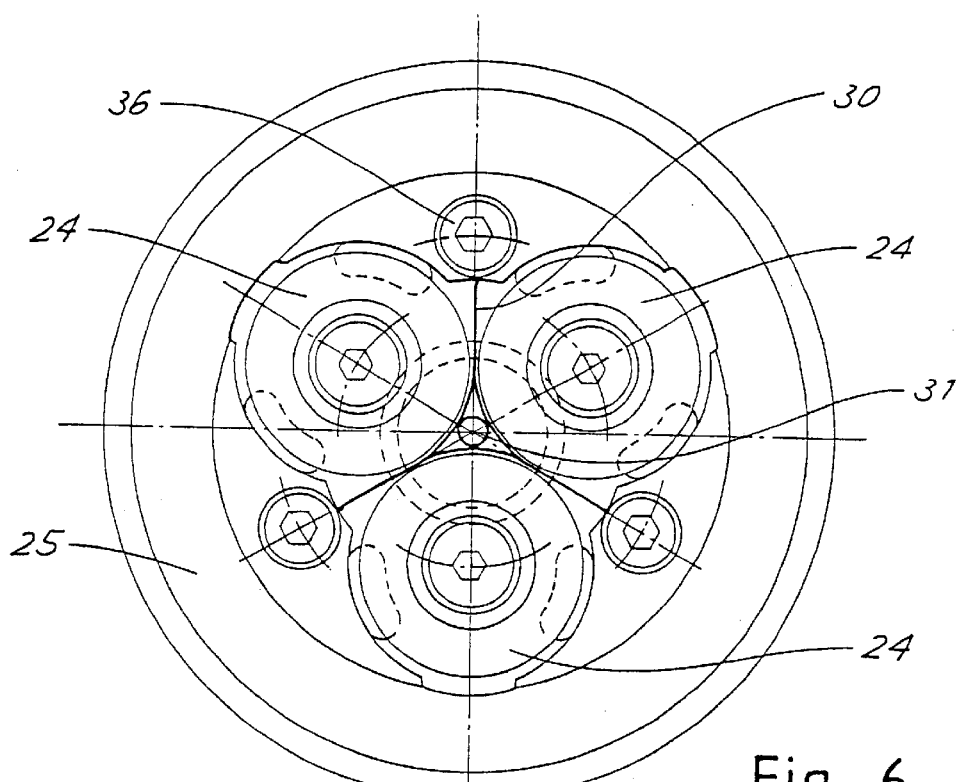
FIG. 6 shows a plan view of the seat of FIG. 5.

As may be seen in FIG. 6 also, between the satellites is arranged a 'star' 30 having three arms arranged at 120° to fasten in appropriate recesses near screws 36 on the satellite holder and identify in the center an electrode tip support zone or member 31 arranged in the center of the reshaping seat. The member 31 displays a surface such as to be inserted between the three satellites and give continuity to the figure of the electrode tip including that zone termed 'lense'. The star can also have an appropriately abrasive surface so as to produce a desired cleaning effect with minor removal of the electrode tip lense.

It is now clear that the predetermined purposes have been achieved by making available a device allowing fast, accurate and effective electrode reshaping.

Figure 7:
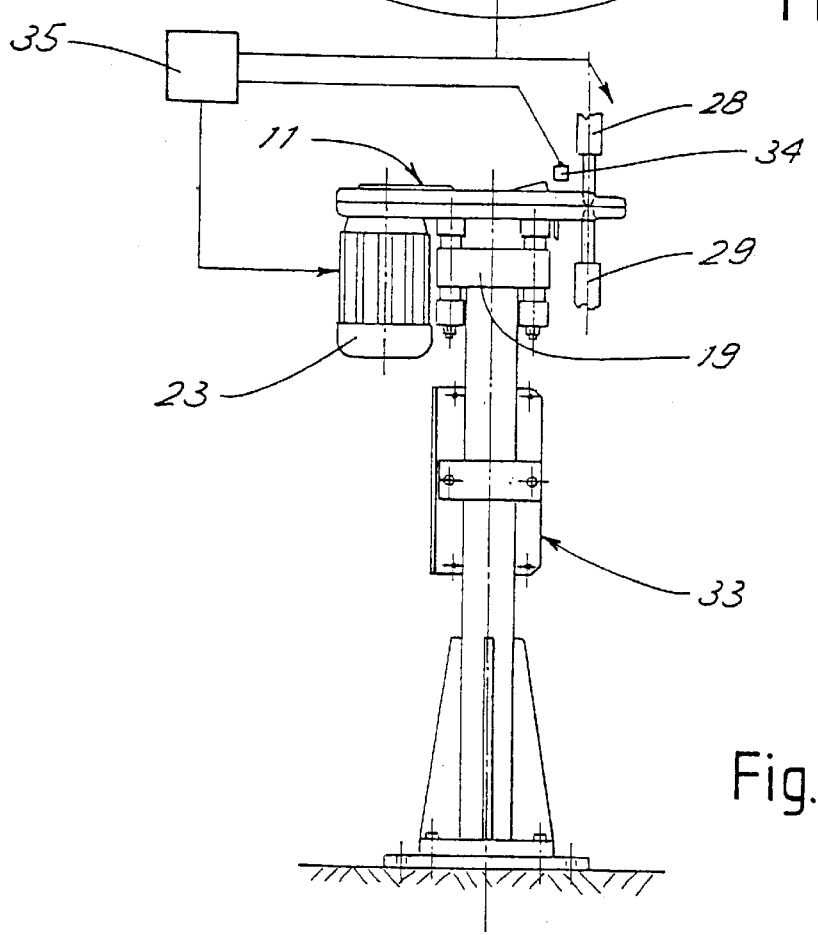
FIG. 7 shows a side elevation view of a variant embodiment of the device of FIG. 1 in fixed gun stations.

Naturally the above description of an embodiment applying the innovative principles of the present invention is given by way of non-limiting example of said principles within the scope of the exclusive right claimed here. For example the satellites could have mutually different dimensions so as to process different zones of the electrode tip. In addition, if it is not considered necessary the powered positioning system for the head in relation to the electrodes can be omitted for example because the electrodes are born by a robotized arm capable of reaching the reshaping seat with its own movement or because the welding gun is a gun operated manually by a worker who can take it to the reshaper. FIG. 7 shows for example a device in accordance with the present invention in which the head 11 is supported by a simple pedestal 33 fastened to the floor. For manual use, accessories are applied to the apparatus which enable the operator to perform the reshaping program safely and rapidly. Thus there is a sensor 34 which detects arrival of the welding gun and through a controller 35 starts the reshaper possibly by disabling at the same time the possibility of accidental operation of the welder. Upon withdrawal of the gun from the reshaper the reshaper is extinguished automatically and the welder is enabled again.

Figure 8:
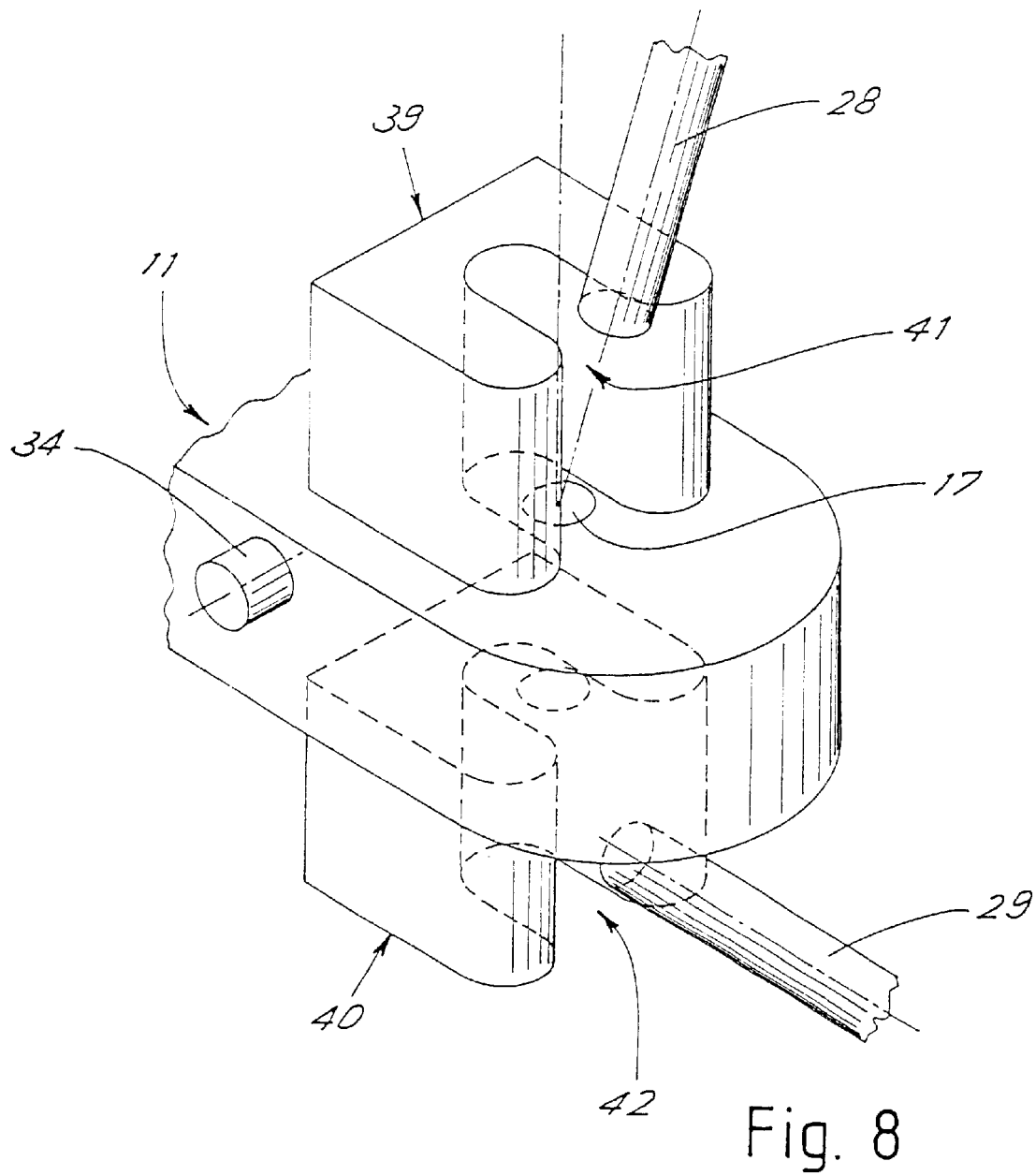
FIG. 8 shows an enlarged view of the variant of FIG. 7 with more added details.

As may be seen in the enlarged detail of FIG. 8, especially in the case of the device for manual use, at the mouth of the seat 17 there can be provided guide blocks 39, 40 having respective grooves 41, 42 shaped to facilitate guidance of the electrodes to the seat 17. In this case the sensor 34 can be advantageously arranged to detect introduction of the electrode in the guide groove.

What is claimed is:

1. Welding gun electrode reshaping device comprising
   a head,
   satellites of the head supported by a satellite holder define between the satellites opposing seats for a tip zone of the electrodes of the gun, the satellite holder being powered to rotate around said opposing seats to move the satellites around the electrode tip zone and provoke reshaping of a side portion of said electrode tip zone, and
   an abrasive support member for the electrode tips in the seats with a surface of the support member simultaneously smoothing a lense zone on the electrode tip while the side portion of the electrode tip zone is reshaped by the satellites.

2. Device in accordance with claim 1, wherein the satellites are three in number arranged 120° apart.

3. Device in accordance with claim 1, wherein the support member is formed by a central zone of a star-shaped member with arms of the star-shaped member passing between the satellites to be fastened peripherally to the satellite holder to give continuity to the tip.

4. Device in accordance with claim 1, wherein said head is supported elastically by a support through elastically yielding buffers.

5. Device in accordance with claim 1, wherein said head has an elongated form with satellites at one end and a motor for rotation of the satellite holder at the other end and an elastic support is in a central zone.

6. Device in accordance with claim 1, wherein said head is supported by a powered arm for moving the head between a rest position and an operating position.

7. Device in accordance with claim 1, wherein the seats have blocks with shaped grooves for guiding the electrodes towards their respective seats.

8. Welding gun electrode reshaping device comprising
   a head with satellites supported by a satellite holder to identify between the satellites opposing seats for a tip of the electrodes of the gun with the satellite holder being powered to rotate around said seats to move the satellites around the electrode tip zone and provoke reshaping of said electrode tip zone with there being in said seats a support member for the electrode tip in the seat with a surface designed for simultaneous smoothing of a lense zone on the electrode tip, and a sensor for starting rotation of the satellite holder upon approach of the electrodes to the seat.

9. Device in accordance with claim 8, wherein the seats have blocks with shaped grooves for guiding the electrodes towards their respective seats and in that the sensor is fitted in the block to detect passage of an electrode in the respective groove.

10. Welding gun electrode reshaping device comprising
    a head with satellites supported by a satellite holder to identify between the satellites opposing seats for a tip of the electrodes of the gun with the satellite holder being powered to rotate around said seats to move the satellites around the electrode tip zone and provoke reshaping of said electrode tip zone with there being in said seats a support member for the electrode tip in the seat with a surface designed for simultaneous smoothing of a lense zone on the electrode tip, and cleaning nozzles blowing into said seats.

* * * * *